(12) United States Patent
Tempel et al.

(10) Patent No.: US 12,028,330 B2
(45) Date of Patent: Jul. 2, 2024

(54) SYSTEMS AND METHODS FOR CREDENTIALS DISTRIBUTION

(71) Applicant: Ivanti, Inc., South Jordan, UT (US)

(72) Inventors: Mark Tempel, Minneapolis, MN (US); Andrew Moravec, White Bear Lake, MN (US)

(73) Assignee: Ivanti, Inc., South Jordan, UT (US)

( * ) Notice: Subject to any disclaimer, the term of this patent is extended or adjusted under 35 U.S.C. 154(b) by 387 days.

(21) Appl. No.: 17/409,218

(22) Filed: Aug. 23, 2021

(65) Prior Publication Data

US 2021/0385208 A1 Dec. 9, 2021

Related U.S. Application Data

(63) Continuation of application No. 16/287,335, filed on Feb. 27, 2019, now Pat. No. 11,102,193.

(51) Int. Cl.
*H04L 9/40* (2022.01)
*G06F 21/44* (2013.01)
*G06F 21/60* (2013.01)
*H04L 67/1097* (2022.01)

(52) U.S. Cl.
CPC .......... *H04L 63/0823* (2013.01); *G06F 21/44* (2013.01); *G06F 21/604* (2013.01); *H04L 63/0428* (2013.01); *H04L 63/045* (2013.01); *H04L 63/0464* (2013.01); *H04L 63/06* (2013.01); *H04L 63/061* (2013.01); *H04L 67/1097* (2013.01)

(58) Field of Classification Search
CPC ... G06F 21/44; G06F 21/604; H04L 63/0428; H04L 63/045; H04L 63/0464; H04L 63/06; H04L 63/061; H04L 63/062; H04L 63/0823; H04L 67/1097
See application file for complete search history.

(56) References Cited

U.S. PATENT DOCUMENTS

| | | | | |
|---|---|---|---|---|
| 6,816,966 | B1 * | 11/2004 | Gupta | H04L 9/3271 713/163 |
| 7,802,065 | B1 * | 9/2010 | Eatough | G06F 16/172 711/158 |
| 8,024,784 | B1 * | 9/2011 | Issa | H04L 63/0281 713/153 |
| 8,474,025 | B2 * | 6/2013 | Royer | G06F 21/32 726/19 |
| 8,510,810 | B2 * | 8/2013 | Solin | H04L 9/006 726/5 |

(Continued)

*Primary Examiner* — Harris C Wang

(57) ABSTRACT

A method by a management server is described. The method includes receiving a credentials request from a requesting management node. The credentials request includes a public key of the requesting management node. The method also includes determining whether the management server has credentials encrypted for the requesting management node in a local cache. The credentials are encrypted using the public key of the requesting management node and cannot be decrypted by the management server. The method further includes sending the encrypted credentials to the requesting management node when the management server has the encrypted credentials. The requesting management node can decrypt the encrypted credentials using a private key.

10 Claims, 8 Drawing Sheets

(56) References Cited

U.S. PATENT DOCUMENTS

| | | | | |
|---|---|---|---|---|
| 8,533,309 | B1* | 9/2013 | Howarth | H04L 41/048 |
| | | | | 709/223 |
| 8,918,529 | B1* | 12/2014 | Batchu | H04L 63/20 |
| | | | | 709/229 |
| 9,252,958 | B1* | 2/2016 | Tempel | H04L 9/3271 |
| 9,384,362 | B2* | 7/2016 | Cabrera | G06F 21/6218 |
| 9,679,122 | B1* | 6/2017 | DeHaan | G06F 21/31 |
| 2006/0004662 | A1* | 1/2006 | Nadalin | H04L 63/0823 |
| | | | | 705/50 |
| 2008/0260149 | A1* | 10/2008 | Gehrmann | G06Q 20/3821 |
| | | | | 380/247 |
| 2010/0161965 | A1* | 6/2010 | Solin | H04L 9/3268 |
| | | | | 713/182 |
| 2010/0306554 | A1* | 12/2010 | Nunez-Tejerina | |
| | | | | H04L 63/0823 |
| | | | | 713/193 |
| 2012/0233465 | A1* | 9/2012 | Baentsch | H04L 9/088 |
| | | | | 713/168 |
| 2014/0325231 | A1* | 10/2014 | Hook | H04L 9/088 |
| | | | | 713/171 |
| 2016/0066183 | A1* | 3/2016 | Conant | H04L 63/0853 |
| | | | | 726/6 |
| 2016/0080943 | A1* | 3/2016 | Ives-Halperin | G06Q 10/02 |
| | | | | 713/168 |
| 2017/0279806 | A1* | 9/2017 | Marttinen | H04L 63/10 |
| 2018/0063123 | A1* | 3/2018 | Tempel | H04L 63/061 |

* cited by examiner

SYSTEMS AND METHODS FOR CREDENTIALS DISTRIBUTION

CROSS-REFERENCE TO RELATED APPLICATIONS

This application claims benefit of and priority to U.S. patent application Ser. No. 16/287,335, filed Feb. 27, 2019 which is a continuation application of International Application No. PCT/US2017/049197, filed Aug. 29, 2017, which claims priority to and the benefit of U.S. patent application Ser. No. 15/250,496, filed Aug. 29, 2016, the disclosures of each of these are incorporated herein by reference.

TECHNICAL FIELD

The present disclosure generally relates to computers and computer-related technology. More specifically, the present disclosure relates to systems and methods for credentials distribution.

The use of electronic devices has become increasingly prevalent in modern society. As the cost of electronic devices has declined, and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. As the size of networks has increased, the use of computers configured as management nodes (i.e., computers configured to manage other computers on the network) has increased. Networks may link computers together that are a great distance apart.

One of the challenges involved with networks is security. To perform management tasks on computing devices in a network, credentials may need to be entered. These credentials may include a username and password. Management tasks may be implemented by a management node using stored encrypted credentials. However, in some cases, a management node may not have credentials needed to perform a task. As can be observed from this discussion, systems and methods that provide secure peer-to-peer credential sharing, replication and recovery may be beneficial.

DETAILED DESCRIPTION

Figure 1:
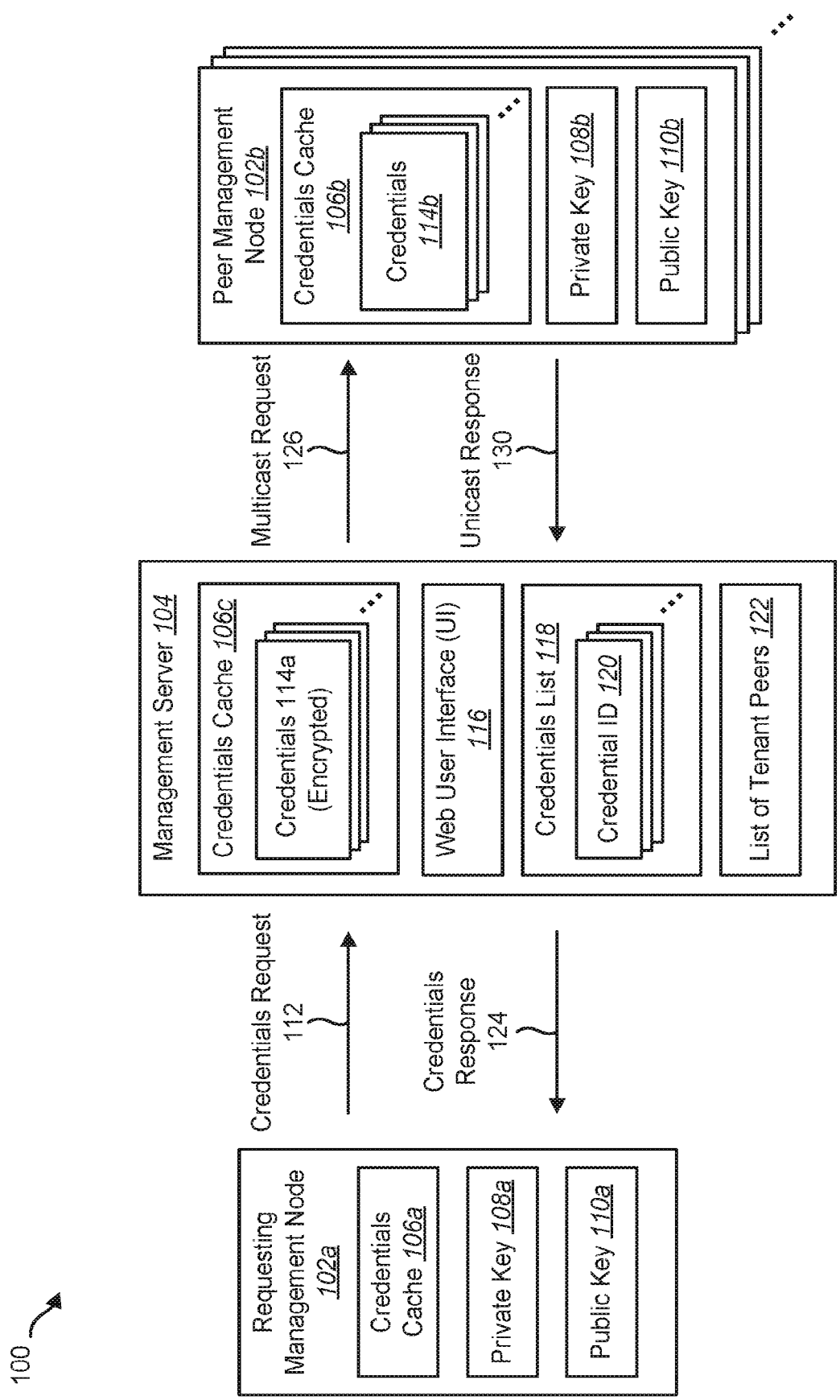
FIG. 1 is a block diagram illustrating one configuration of a network for credentials distribution.

A method by a management server is described. The method includes receiving a credentials request from a requesting management node. The credentials request includes a public key of the requesting management node. The method also includes determining whether the management server has encrypted credentials for the requesting management node in a local cache. The encrypted credentials are encrypted using the public key of the requesting management node and cannot be decrypted by the management server. The method further includes sending the encrypted credentials to the requesting management node when the management server has the encrypted credentials. The requesting management node can decrypt the encrypted credentials using a private key.

The requesting management node may send the credentials request upon determining that credentials required to perform a task cannot be resolved or acquired. The requesting management node may send the credentials request as part of an automated recovery process that does not require a user to re-enter credentials.

When the management server determines that it does not have the encrypted credentials, the method may further include sending a multicast request to one or more peer management nodes. The multicast request may include the public key of the requesting management node. The method may also include receiving a unicast response from a responding management node that includes encrypted credentials for the requesting management node. The method may further include sending the encrypted credentials received from the responding management node to the requesting management node.

The method may also include storing the encrypted credentials received from the responding management node in the local cache of the management server. The management server may be a cloud-based server. The requesting management node and the one or more peer management nodes may be part of a same tenancy.

When the credentials are initially set, the management server may use a public key infrastructure (PKI) to encrypt the credentials in a manner in which only a management node for which the credentials are encrypted can decrypt the credentials.

A management server is also described. The management server includes a processor, memory in electronic communication with the processor and instructions stored in the memory. The instructions are executable to receive a credentials request from a requesting management node. The credentials request includes a public key of the requesting management node. The instructions are also executable to determine whether the management server has encrypted credentials for the requesting management node in a local cache. The encrypted credentials are encrypted using the public key of the requesting management node and cannot be decrypted by the management server. The instructions are further executable to send the encrypted credentials to the requesting management node when the management server has the encrypted credentials. The requesting management node can decrypt the encrypted credentials using a private key.

A method by a responding management node is also described. The method includes receiving a multicast request from a management server in response to a credentials request sent by a requesting management node when the requesting management node determines that credentials required to perform a task cannot be resolved or acquired. The multicast request includes a public key of the requesting management node. The method also includes resolving the credentials from a local store. The method further includes encrypting the credentials using the public key of the requesting management node. The method additionally includes sending a unicast response to the management server that includes the encrypted credentials for the requesting management node.

The method may also include decrypting the credentials from the local store using a private key of the responding management node if the credentials are encrypted before re-encrypting the credentials using the public key of the requesting management node.

The method may also include testing a certificate of the requesting management node with a certificate chain of the responding management node. The method may further include validating that the requesting management node is trusted to receive credentials.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a network 100 for credentials 114 distribution. The network 100 may include a plurality of electronic devices that are in electronic communication with one another.

The network 100 may include one or more Local Area Networks (LANs), Wide Area Networks (WANs), Wireless Local Area Networks (WLANs), the Internet, etc. The network 100 may include a plurality of management nodes 102 and at least one management server 104.

The management server 104 may be a cloud-based server. For example, the management server 104 may be accessible via an Internet connection. The management server 104 may also be located physically at the same location as one or more of the management nodes 102.

The network 100 also includes one or more management nodes 102. Examples of the management node 102 include a desktop computer, laptop computer, tablet computer, smartphone, router, printers, etc. A network segment (e.g., subnet) may include one or more management nodes 102.

The management server 104 may perform a variety of management-related operations in conjunction with the management node(s) 102. Examples of these management-related operations include managing the managed node's 102 operating configurations, the managed node's 102 files, etc.

In an implementation, management-related operations may be performed by an agent operating on the management node 102. The agent may be part of a network management system that is used to manage the management node 102. For example, management systems may include one or more of the following software products: LANDesk Shavlik®, LANDeskWavelink Avalanche®, Altiris®, Microsoft® SCCM or a BMC® management system.

The management server 104 may coordinate management-related operations for one or more tenants. As used herein, a "tenant" may be an organization, an enterprise, a business, a customer, a university, a non-profit organization, a government agency, etc. A single management server 104 may perform management-related operations for multiple distinct tenants. For example, each of the tenants may share a single backend cloud service for managing computers.

Each tenant may have one or more management nodes 102. In an implementation, a management node 102 may include an agent or piece of installation software. A management node 102 may reside on a tenant's network 100. Each network 100 may have more than one management node 102. For example, in a segmented network 100, there may be a management node 102 in each network segment. A network segment may be a completely firewalled-off subnet communicating with other subnets that are all completely firewall ed. These subnets may be located anywhere in the world.

The management nodes 102 may maintain a connection to the management server 104. An end user (e.g., administrator) at the management server 104 may send computer management instructions and may see results based on this connection.

The management server 104 may provide global management of multiple networks 100. Each management node 102 in a given tenancy may be enrolled in a public key infrastructure (PKI) that shares trust across the tenant. In a chain of trust, a public key 110 and private key 108 pair form a certificate. The certificate of a management node 102 may be issued from a trusted certificate authority. The certificate may be specific to a given tenant. A certificate of one management node 102 may sign the certificate of another management node 102 in that tenant. In this way, a chain of trust may be established between devices within a tenant. If for any reason, another tenant's certificate would be passed to a management node 102, that management node 102 could detect that the certificate was not trusted, because the certificate does not follow the chain up to the initial trust that a management node 102 expects.

Each management node 102 may be configured with a set of tasks that it performs to manage their respective network segments. Some tasks may require credentials 114. The credentials 114 may include a user name and password. A management node 102 may use the credentials 114 to access other nodes on the network 100 to perform a given task. Examples of these tasks include, but are not limited to, making changes to the operating system of a node, turning on and off firewalls and patching a node on the network 100.

For administrative operations, the credentials 114 may be important ones (e.g., Administrator, or Domain Administrator). For example, the management node 102 may log into a node as the administrator using the administrator username and password. Because these credentials 114 provide significant access to the network 100, it is important to protect these credentials 114.

A user (e.g., network administrator) may wish to re-use components of their configuration including confidential elements such as credentials 114 (e.g., usernames and passwords). For example, if a management node 102 is installed and does not have the credentials 114 needed to perform a task, it may be beneficial to distribute the credentials 114 to that management node 102.

In one approach, this problem has been solved by installing agents on each endpoint being managed, or installing a separate management server with no affiliation in each network segment. The separate management servers may store a master copy of secrets that can be retrieved as necessary. However, this results in multiple management servers and increased system complexity.

In another approach, the secrets (i.e., credentials 114) are encrypted such that they are stored in the cloud, but the decryption keys (e.g., private key 108) are also in the cloud. In other words, a single management server may store encrypted credentials 114 and the private key 108 to decrypt the credentials 114. However, if a malicious user gains access to this data-store, this user very likely has the keys required to access all the encrypted secrets.

In yet another approach, a user may have to enter missing credentials 114 every time they are needed. However, this approach may be time consuming and frustrating for a user. Therefore, when multiple management nodes 102 are installed in a network 100, a user may wish to enter the credentials 114 a single time and have the credentials 114 securely distributed between the management nodes 102.

The systems and methods described herein provide for secure distribution, replication and recovery of credentials 114. In the case of a cloud service, it is desirable for the cloud service to not be responsible for maintaining the confidentiality of a tenant's credentials 114. For example, if the cloud service is attacked, the cloud service provider does not want to be responsible for keeping a tenant's secrets.

The described systems and methods allow a tenant to distribute credentials 114 from the management server 104 or from a peer management node 102*b* in a secure manner. The described systems and methods allow a management node 102 to access credentials 114 when the credentials 114 are not stored in a manner that is decryptable by the management server 104.

As described above, each management node 102 has a configured set of tasks it performs to manage their respective network segments. Some tasks require credentials 114. In an implementation, the management server 104 (e.g., a cloud service) may be used to configure these tasks. During this configuration, a user may set their credentials 114 for the given tasks into a web user interface (UI) 116 of the management server 104. In another implementation, a user may enter the credentials 114 directly into a management node 102.

The management server 104 may use a PKI to encrypt all credentials 114 at the time they are set in the web UI 116 in a manner where only the single management node 102 for which the credentials 114 are encrypted may decrypt the credentials 114. In order to be most secure, credentials 114 are encrypted upon user input with a public/private key pair that is established during registration of the management node 102. The credentials 114 are encrypted before they are persisted (e.g., stored) in the cloud in a manner in which only the private key 108 holder can decrypt the secret. The private keys 108 are never available in the cloud, only on the installed endpoints (i.e., management nodes 102).

When a user installs and configures a management node 102, the user may set up a comprehensive policy for distributing credentials 114. The user may then install a second management node 102 and reuse the credentials by reference without requiring the user to re-enter the confidential passwords.

In an implementation, the management server 104 may have a store of public keys 110 for the various management nodes 102 in the network 100. The management server 104 may use the public key 110 of a given management node 102 to encrypt the credentials 114 for that management node 102. The management server 104 may then provide the encrypted credentials 114 to the management node 102. The management node 102 may then decrypt the credentials 114 using its private key 108.

The credentials 114 are never stored on the management server 104 in a form by which the management server 104 itself may decrypt them. For example, the management server 104 may not store the private keys 108 of the management nodes 102. In one implementation, once the user enters the credentials 114 into the web UI 116, the management server 104 may store the encrypted credentials 114*a* in a credentials cache 106*c*. However, the management server 104 cannot decrypt these encrypted credentials 114*a*. In another implementation, the management server 104 may encrypt the credentials 114 and send the credentials to the management node 102 without saving the encrypted credentials 114*a*.

It should be noted that credentials cache 106*c* of the management server 104 may be different than the credentials cache 106*a* of the requesting management node 102*a*. For example, the credentials cache 106*c* of the management server 104 may include only credentials 114*a* encrypted for specific management nodes 102. Therefore, the encrypted credentials 114*a* in the credentials cache 106*c* are not decryptable by the management server 104. By contrast, the credentials cache 106*a* on a management node 102 may contain credentials 114 that are decryptable by the management node.

In some cases, a requesting management node 102*a* may determine that credentials 114 required to perform a task cannot be resolved or acquired. For example, the requesting management node 102*a* may be newly installed on the network 100. This requesting management node 102*a* may not have needed credentials 114 stored in its credentials cache 106*a* to perform a given task.

In an implementation, when the requesting management node 102*a* starts up, it may send a credential ID request to the management server 104. The management server 104 may have a credentials list 118 that includes the credential IDs 120 for one or more credentials 114 that the requesting management node 102*a* should have to perform its tasks. A credential ID 120 may be a random number that is assigned with given credentials 114. The management server 104 may send the credential IDs 120 to the requesting management node 102*a*. Using these credential IDs 120, the requesting management node 102*a* may check its local credentials cache 106*a* to see if it has these credentials 114 encrypted specifically for that managed node 102*a*.

If the requesting management node 102*a* determines that it does not have the credentials 114, the requesting management node 102*a* may send a credentials request 112 to the management server 104. The credentials request 112 may ask the management server 104 to provide the missing credentials 114. The requesting management node 102*a* may include its public key 110*a* in the credentials request 112.

Upon receiving the credentials request 112 from the requesting management node 102*a*, the management server 104 may determine whether it has encrypted credentials 114*a* for the requesting management node 102*a* in a local cache. For example, the management server 104 may check its credentials cache 106*c* to see whether it has stored the credentials 114*a* encrypted using the public key 110*a* of the requesting management node 102a. As described above, the encrypted credentials 114a in the credentials cache 106c cannot be decrypted by the management server 104.

If the management server 104 has the encrypted credentials 114a for the requesting management node 102a, then the management server 104 may send the encrypted credentials 114a to the requesting management node 102a in a credentials response 124. Upon receiving the credentials response 124, the requesting management node 102a may decrypt the encrypted credentials 114a using its private key 108a. The requesting management node 102a may then use the credentials 114a to perform the configured task.

If the management server 104 does not have the encrypted credentials 114a for the requesting management node 102a, then the management server 104 may send a multicast request 126 to one or more peer management nodes 102b. These peer management nodes 102b may be in the same tenant as the requesting management node 102a. The management server 104 may include a list of tenant peers 122 that identifies management nodes 102 within the same tenant. The management server 104 may send the multicast request 126 to one or more of the peer management nodes 102b that are included in the list of tenant peers 122.

The multicast request 126 may identify which credentials 114 are requested. The multicast request 126 may also include the public key 110a from the requesting management node 102a.

Upon receiving the multicast request 126, a peer management node 102b may respond to the multicast request 126. This responding peer management node 102b (referred to as a responding management node 102b) may validate that the credentials request 112 came from a requesting management node 102a that trusts the same certificate chain.

If the requesting management node 102a trusts the same certificate chain, then, upon validation, the responding management node 102b may attempt to resolve the credentials 114 from its local store (i.e., credentials cache 106b) that had previously been set. In this case, the responding management node 102b may store encrypted credentials 114b for itself These encrypted credentials 114b may be encrypted with the public key 110b of the responding management node 102b.

It should be noted that on a peer management node 102b, the credentials 114b may be encrypted, but they are encrypted in a different manner than on the management server 104. In this case, the encrypted credentials 114b stored on the peer management node 102b are decryptable by the peer management node 102b, whereas the encrypted credentials 114a stored on the management server 104 are not decryptable by the management server 104.

Furthermore, the credentials 114b on a peer management node 102b may not be encrypted at all. In other words, the peer management node 102b may store credentials 106b in the credentials cache 106b in an unencrypted state.

If the responding management node 102b stores encrypted credentials 114b, then the responding management node 102b may decrypt the encrypted credentials 114b using its private key 108b. The responding management node 102b may then re-encrypt the credential 114b using the public key 110a of the requesting management node 102a that was included in the multicast request 126. Unless the responding management node 102b decrypts and shares the previously encrypted credentials 114b, there is no feasible approach other than re-entry by the user to encrypt the credentials 114 for the newly registered requesting management node 102a.

The responding management node 102b may then send a unicast response 130 to the management server 104. The unicast response 130 may include the credentials 114 that are encrypted for the requesting management node 102a. The management server 104 may (optionally) store these encrypted credentials 114 in its credentials cache 106c. The management server 104 may then send the encrypted credentials 114 to the requesting management node 102a in a credentials response 124.

Upon receiving the credentials response 124, the requesting management node 102a may decrypt the credentials 114 using its private key 108a. The requesting management node 102a may then store the credentials locally for immediate or future use.

In an implementation, the described systems and methods may enable secure distribution, replication of confidential information. This replication may be used for disaster recovery scenarios. For example, in a multi-management node 102 network 100, one or more management nodes 102 may be lost, destroyed or corrupted.

In re-installation of a lost endpoint (i.e., a lost management node 102), registration to the same tenancy allows automated recovery of confidential information from peer sources. For example, a user may reinstall a management node 102 on the network 100. The reinstalled management node 102 may then register with the management server 104 to acquire any credentials 114 as described above. The end user does not need to do any additional data entry to recover these credentials 114.

The described systems and methods enable global management and re-use of confidential information such as passwords without ever allowing the credentials 114 to be persisted in the cloud (e.g., the management server 104) in a manner in which the confidential information may be decrypted.

Figure 2:
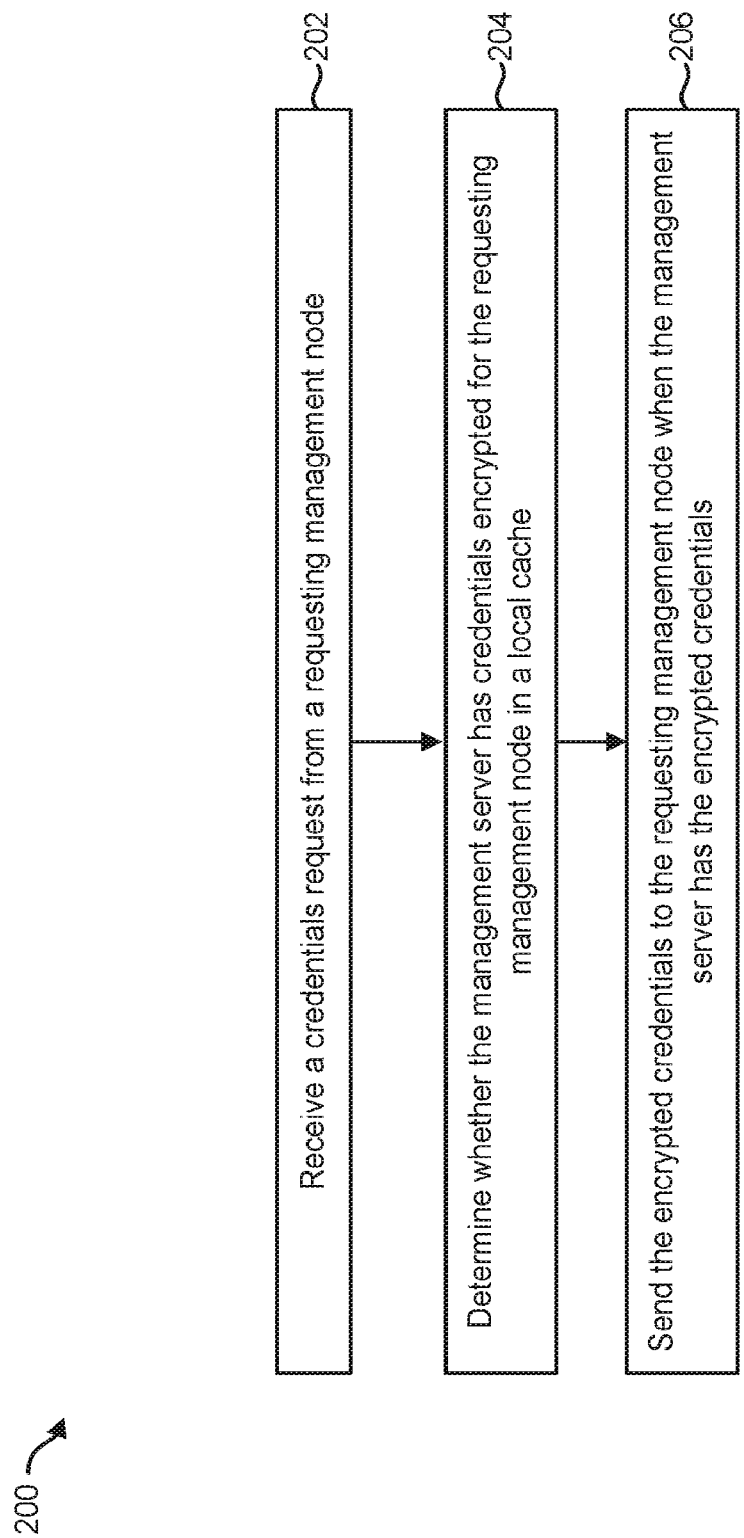
FIG. 2 is a flow diagram illustrating one configuration of a method for credentials distribution.

FIG. 2 is a flow diagram illustrating one configuration of a method 200 for credentials 114 distribution. The method 200 may be implemented by a management server 104. The management server 104 may be in communication with one or more management nodes 102 via a network 100.

The management server 104 may receive 202 a credentials request 112 from a requesting management node 102a. The credentials request 112 may include a public key 110a of the requesting management node 102a. For example, the requesting management node 102a may send the credentials request 112 to the management server 104 upon determining that the credentials 114 required to perform a task cannot be resolved or acquired.

The management server 104 may determine 204 whether it has credentials 114 encrypted for the requesting management node 102a in a local cache. The credentials 114 may be encrypted using the public key 110a of the requesting management node 102a and cannot be decrypted by the management server 104.

The management server 104 may send 206 the encrypted credentials 114 to the requesting management node 102a when the management server 104 has the encrypted credentials 114. If the management server 104 determines 204 that it has encrypted credentials 114 for the requesting management node 102a in a credentials cache 106c, the management server 104 may send 206 the encrypted credentials 114 to the requesting management node 102a.

If the management server 104 determines 204 that it does not have encrypted credentials 114 for the requesting management node 102a, then the management server 104 may send a multicast request 126 to one or more peer management nodes 102b. The multicast request 126 may include the public key 110a of the requesting management node 102a.

Upon receiving the multicast request 126, a responding management node 102b may validate that the requesting management node 102a is trusted to receive credentials. This may be done by testing the certificate of the requesting management node 102a with its certificate chain.

Upon validation, the responding management node 102b may resolve the credentials 114 from its local store (e.g., credentials cache 106b) and may decrypt the credentials 114 using its private key 108b. The responding management node 102b may then re-encrypt the credentials 114 using the public key 110a of the requesting management node 102a. The responding management node 102b may send the encrypted credentials 114 in a unicast response 130 to the management server 104.

Upon receiving the unicast response 130, the management server 104 may send 206 the encrypted credentials 114 received from the responding management node 102b to the requesting management node 102a in a credentials response 124. The requesting management node 102a can decrypt the encrypted credentials 114 using its private key 108a.

Figure 3:
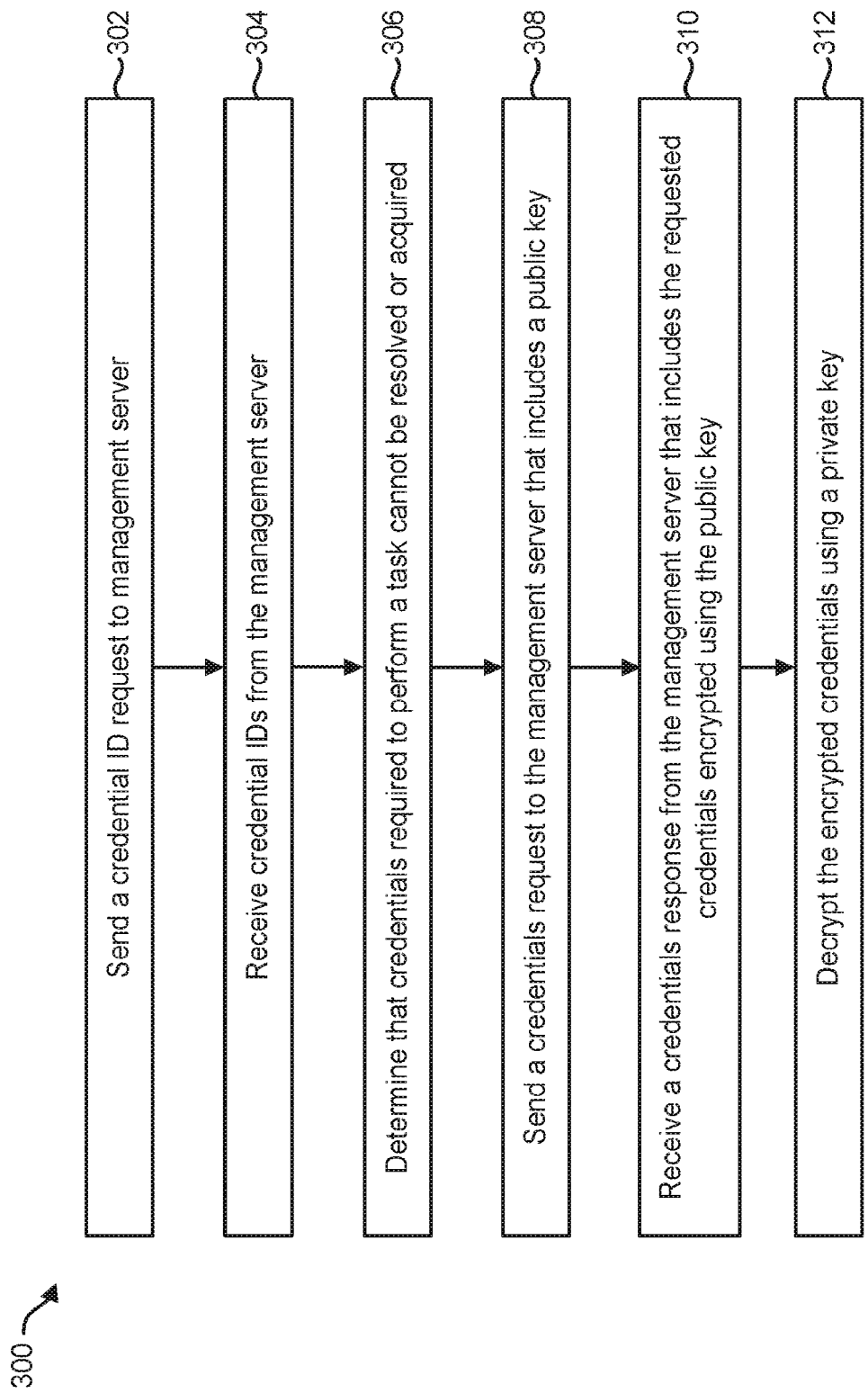
FIG. 3 is a flow diagram illustrating a configuration of a method for credentials distribution implemented by a requesting management node.

FIG. 3 is a flow diagram illustrating a configuration of a method 300 for credentials 114 distribution implemented by a requesting management node 102a. The requesting management node 102a may be in communication with a management server 104 via a network 100 that includes one or more peer management nodes 102b.

The requesting management node 102a may send 302 a credential ID request to the management server 104. The management server 104 may have a credentials list 118 that includes the credential IDs 120 for one or more credentials 114 that the requesting management node 102a should have to perform its tasks.

The requesting management node 102a may receive 304 one or more credential IDs 120 from the management server 104. For example, upon receiving the credential ID request, the management server 104 may send the one or more credential IDs 120 to the requesting management node 102a.

The requesting management node 102a may determine 306 that credentials 114 required to perform a task cannot be resolved or acquired. For example, the requesting management node 102a may check its credentials cache 106a using the one or more credential IDs 120. The requesting management node 102a may determine that it does not have one or more credentials 114 indicated by the credential IDs 120.

The requesting management node 102a may send 308 a credentials request 112 to the management server 104. The credentials request 112 may include the public key 110a of the requesting management node 102a. The credentials request 112 may identify the one or more credentials 114 that the requesting management node 102a is missing.

The requesting management node 102a may receive 310 a credentials response 124 from the management server 104 that includes the requested credentials 114 encrypted using the public key 110a. For example, upon receiving the credentials request 112, the management server 104 may determine whether encrypted credentials 114 for the requesting management node 102a are in its credentials cache 106c. The encrypted credentials 114 may be encrypted using the public key 110a of the requesting management node 102a and cannot be decrypted by the management server 104.

In one case, if the management server 104 has the encrypted credentials 114a already encrypted with the public key 110a of the requesting management node 102a stored in its credentials cache 106c, the management server 104 may send the encrypted credentials 114a to the requesting management node 102a in a credentials response 124. In another case, if the management server 104 determines that it does not have encrypted credentials 114a for the requesting management node 102a, then the management server 104 may send a multicast request 126 to one or more peer management nodes 102b. The multicast request 126 may include the public key 110a of the requesting management node 102a.

A responding management node 102b may resolve the credentials 114 from its local store, decrypt the credentials 114 using its private key 108b, and then re-encrypt the credentials 114 using the public key 110a of the requesting management node 102a. The requesting management node 102a may then send the encrypted credentials 114 in a unicast response 130 to the management server 104. Upon receiving the unicast response 130, the management server 104 may send the encrypted credentials 114 received from the responding management node 102b to the requesting management node 102a in a credentials response 124.

The requesting management node 102a may decrypt 312 the encrypted credentials 114 using its private key 108a. Because the credentials 114 were encrypted using the public key 110a of the requesting management node 102a, the requesting management node 102a may decrypt 312 the credentials 114 received in the credentials response 124. The requesting management node 102a may immediately use the decrypted credentials 114. The requesting management node 102a may store the credentials 114 in its credentials cache 106a for future use.

Figure 4:
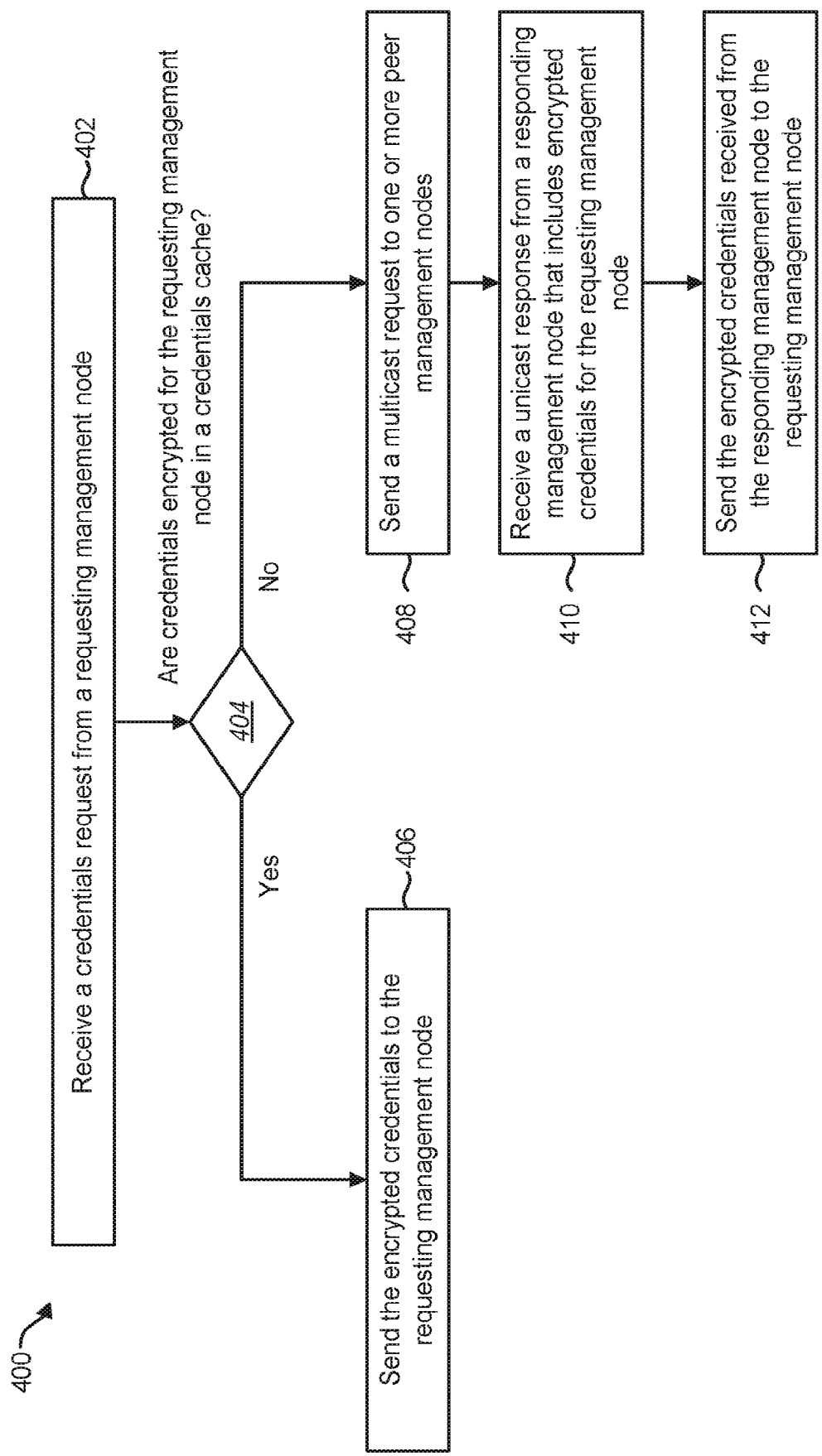
FIG. 4 is a flow diagram illustrating a configuration of a method for credentials distribution implemented by a management server.

FIG. 4 is a flow diagram illustrating a configuration of a method 400 for credentials 114 distribution implemented by a management server 104. The management server 104 may be in communication with one or more management nodes 102 via a network 100.

The management server 104 may receive 402 a credentials request 112 from a requesting management node 102a. The credentials request 112 may include a public key 110a of the requesting management node 102a.

The management server 104 may determine 404 whether credentials 114 encrypted for the requesting management node 102a are in a credentials cache 106c. The credentials 114 may be encrypted using the public key 110a of the requesting management node 102a and cannot be decrypted by the management server 104. If the management server 104 has the encrypted credentials 114a stored in the credentials cache 106c, the management server 104 may send 406 the encrypted credentials 114a to the requesting management node 102a.

If the management server 104 determines 404 that it does not have encrypted credentials 114 for the requesting management node 102a, then the management server 104 may send 408 a multicast request 126 to one or more peer management nodes 102b. The multicast request 126 may include the public key 110a of the requesting management node 102a. The requesting management node 102a and the one or more peer management nodes 102b may be part of the same tenancy.

The management server 104 may receive 410 a unicast response 130 from a responding management node 102b. The unicast response 130 may include encrypted credentials 114 for the requesting management node 102a. For example, the responding management node 102b may resolve the credentials 114 from its local store, decrypt the credentials 114 using its private key 108b, and then re-encrypt the credentials 114 using the public key 110a of the requesting management node 102a. The responding management node 102*b* may then send the encrypted credentials 114 in a unicast response 130 to the management server 104.

Upon receiving the unicast response 130, the management server 104 may send 412 the encrypted credentials 114 received from the responding management node 102*b* to the requesting management node 102*a*. The management server 104 may send 412 the credentials 114 in a credentials response 124. The requesting management node 102*a* can decrypt the encrypted credentials 114 using its private key 108*a*.

Figure 5:
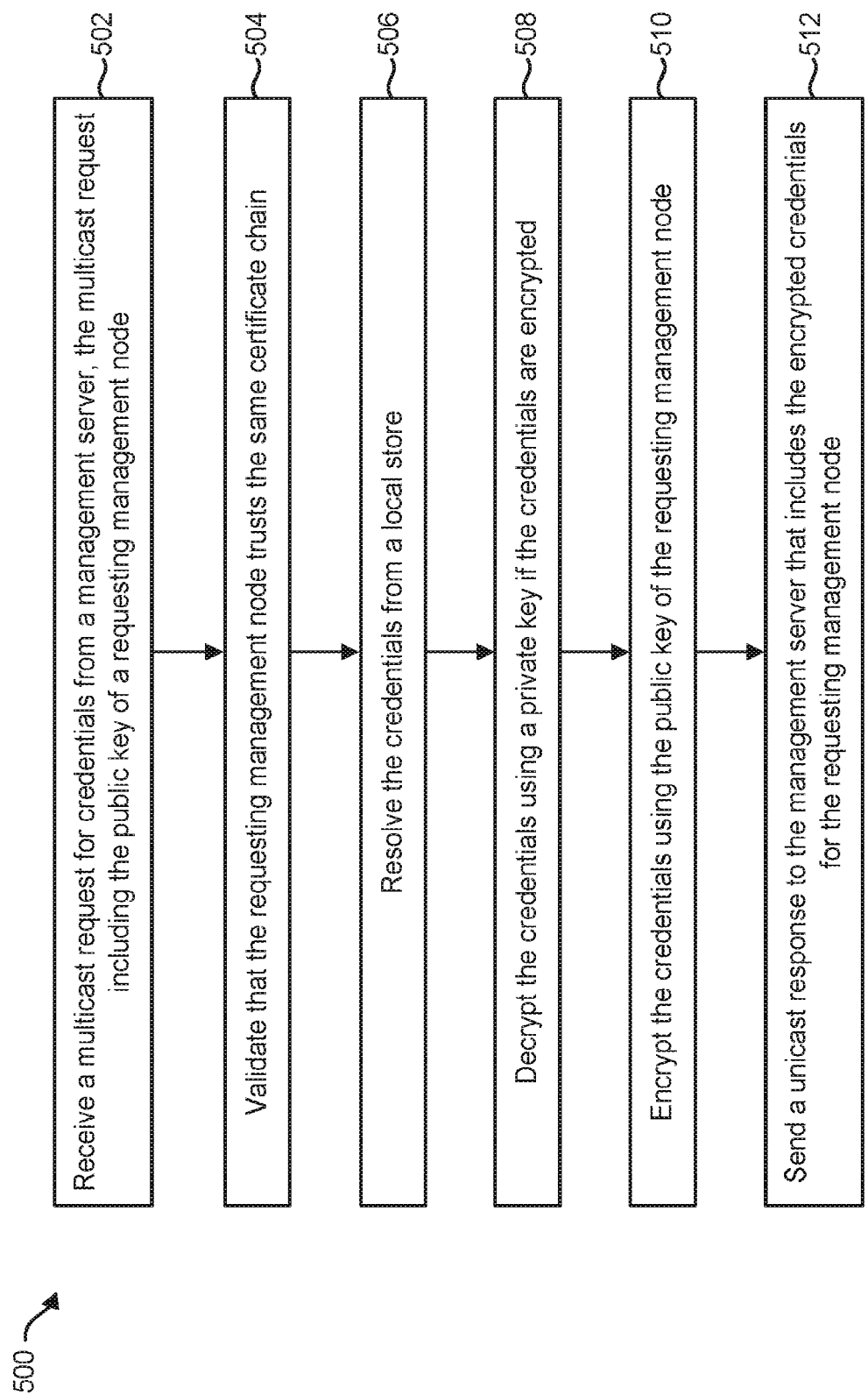
FIG. 5 is a flow diagram illustrating a configuration of a method for credentials distribution implemented by a responding management node.

FIG. 5 is a flow diagram illustrating a configuration of a method 500 for credentials 114 distribution implemented by a responding management node 102*b*. The responding management node 102*b* may be in communication with a management server 104 via a network 100 that includes a requesting management node 102*a*.

The responding management node 102*b* may receive 502 a multicast request 126 from the management server 104. The multicast request 126 may include the public key 110*a* of the requesting management node 102*a*. For example, the requesting management node 102*a* may send a credentials request 112 to the management server 104 that includes the public key 110*a*. If the management server 104 does not have the credentials 114*a* encrypted with the public key 110*a* stored in its credentials cache 106*c*, the management server 104 may send the multicast request 126 to one or more peer management nodes 102*b* in the network 100.

Upon receiving the multicast request 126, the responding management node 102*b* may validate 504 that the requesting management node 102*a* trusts the same certificate chain. For example, the responding management node 102*b* may determine that it and the requesting management node 102*a* belong to the same tenant.

Upon validation, the responding management node 102*b* may resolve 506 the credentials 114 from its local store (e.g., credentials cache 106*b*). If the credentials 114 are encrypted, the responding management node 102*b* may decrypt 508 the credentials 114 using its private key 108*b*. The responding management node 102*b* may then encrypt 510 the credentials 114 using the public key 110*a* of the requesting management node 102*a*.

The responding management node 102*b* may send 512 a unicast response 130 to the management server 104. The unicast response 130 may include the encrypted credentials 114 for the requesting management node 102*a*. The management server 104 may then forward the encrypted credentials 114 to the requesting management node 102*a* in a credentials response 124.

Figure 6:
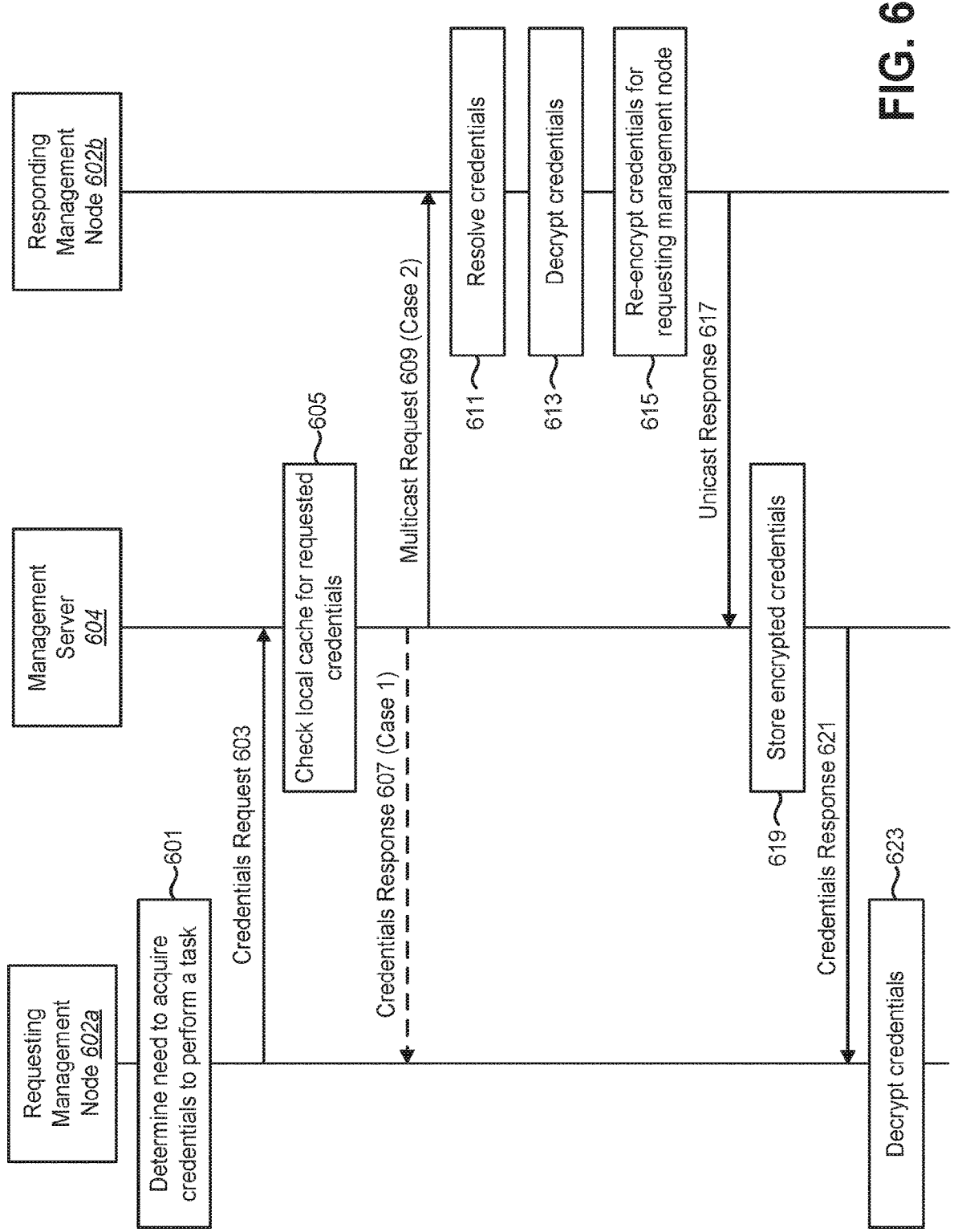
FIG. 6 is a sequence diagram illustrating an implementation of credentials distribution according to the systems and methods described herein.

FIG. 6 is a sequence diagram illustrating an implementation of credentials 114 distribution according to the systems and methods described herein. A network 100 may include a requesting management node 602*a*, a responding management node 602*b* and a management server 604.

The requesting management node 602*a* may determine 601 that it needs to acquire credentials 114 to perform a task. For example, the requesting management node 602*a* may need the credentials 114 to perform an administrative task on a node within its network segment. The requesting management node 602*a* may make this determination based on one or more credential IDs 120 provided by the management server 604.

The requesting management node 602*a* may send 603 a credentials request 112 to the management server 604. The management server 604 may check 605 its local cache (e.g., credentials cache 106*c*) for the requested credentials 114. The credentials 114 may be encrypted using the public key 110*a* of the requesting management node 602*a* and cannot be decrypted by the management server 604.

In a first case (Case 1), the management server 604 has the encrypted credentials 114*a* stored in its local cache. In this case, the management server 604 may send 607 a credentials response 124 that includes the encrypted credentials 114*a* to the requesting management node 602*a*.

In a second case (Case 2), the management server 604 does not have the encrypted credentials 114*a* stored in its local cache. In this case, the management server 604 may send 609 a multicast request 126 to one or more peer management nodes 102*b* (including the responding management node 602*b*). The peer management nodes 102*b* may be included in the same tenancy as the requesting management node 602*a*. The multicast request 126 may include the public key 110*a* of the requesting management node 602*a*.

Upon receiving the multicast request 126, the responding management node 602*b* may validate that the requesting management node 602*a* is trusted to receive credentials. This may be done by testing the certificate of the requesting management node 602*a* with its certificate chain.

Upon validation, the responding management node 602*b* may resolve 611 the credentials 114 from its local store (e.g., credentials cache 106*b*). The responding management node 602*b* may decrypt 613 the credentials 114 using its private key 108*b*. The responding management node 602*b* may then re-encrypt 615 the credentials 114 using the public key 110*a* of the requesting management node 602*a*.

The responding management node 602*b* may send 617 a unicast response 130 to the management server 604. The unicast response 130 may include the encrypted credentials 114 for the requesting management node 602*a*.

The management server 604 may (optionally) store 619 the encrypted credentials 114 in its credentials cache 106*c*. The management server 604 may then send 621 the encrypted credentials 114 to the requesting management node 602*a* in a credentials response 124. The requesting management node 602*a* may decrypt 623 the encrypted credentials 114 using its private key 108*a*.

Figure 7:
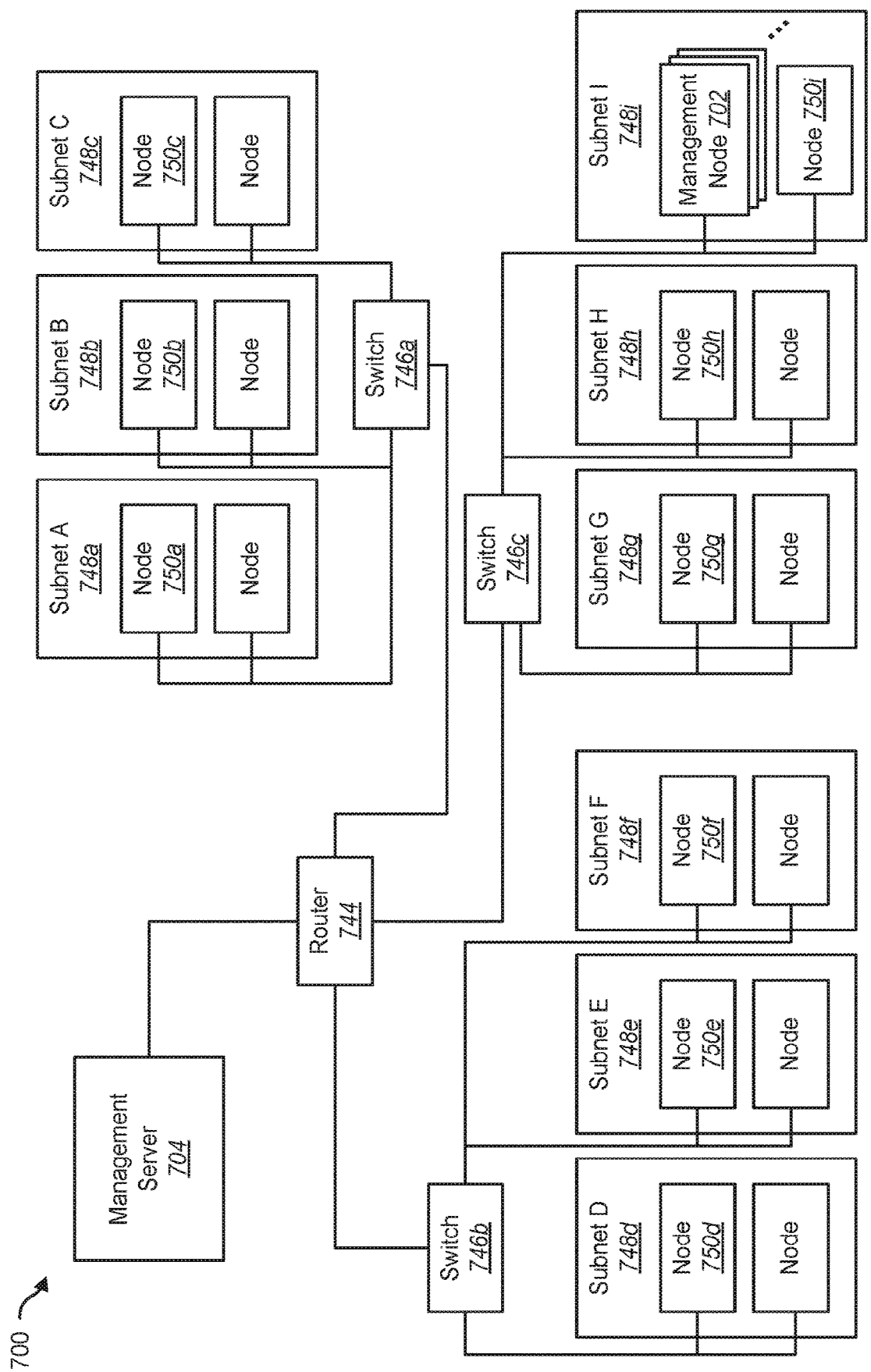
FIG. 7 is a block diagram that illustrates one configuration of a network where systems and methods for credentials distribution may be implemented.

FIG. 7 is a block diagram that illustrates one configuration of a network 700 where systems and methods for credentials 114 distribution may be implemented. A management server 704 is connected to a router 744. The router 744 is connected to switches 746*a*, 746*b*, and 746*c*. The switch 746*a* is connected to several nodes 750*a*, 750*b*, 750*c*, etc., via their respective subnets 748*a*, 748*b*, and 748*c*. The switch 746*b* is connected to several nodes 750*d*, 750*e*, 750*f*, etc., via their respective subnets 748*d*, 748*e*, and 748*f*. The switch 746*c* is connected to several nodes 750*g*, 750*h*, and 750*i*, etc., via their respective subnets 748*g*, 748*h* and 748*i*. Subnet I 748*i* includes one or more management nodes 702.

Although FIG. 7 only shows one router 744, and a limited number of switches 746, subnets 748 and nodes 750, many and varied numbers of routers 744, switches 746, subnets 748 and nodes 750 may be included in networks and/or systems that may implement systems and methods for credentials 114 distribution.

It should be noted that the management server 704 may be implemented in accordance with the management server 104 described in connection with FIG. 1. Furthermore, the management nodes 702 may be examples of one or more of the requesting management node 102*a* and peer management nodes 102*b* described herein.

Figure 8:
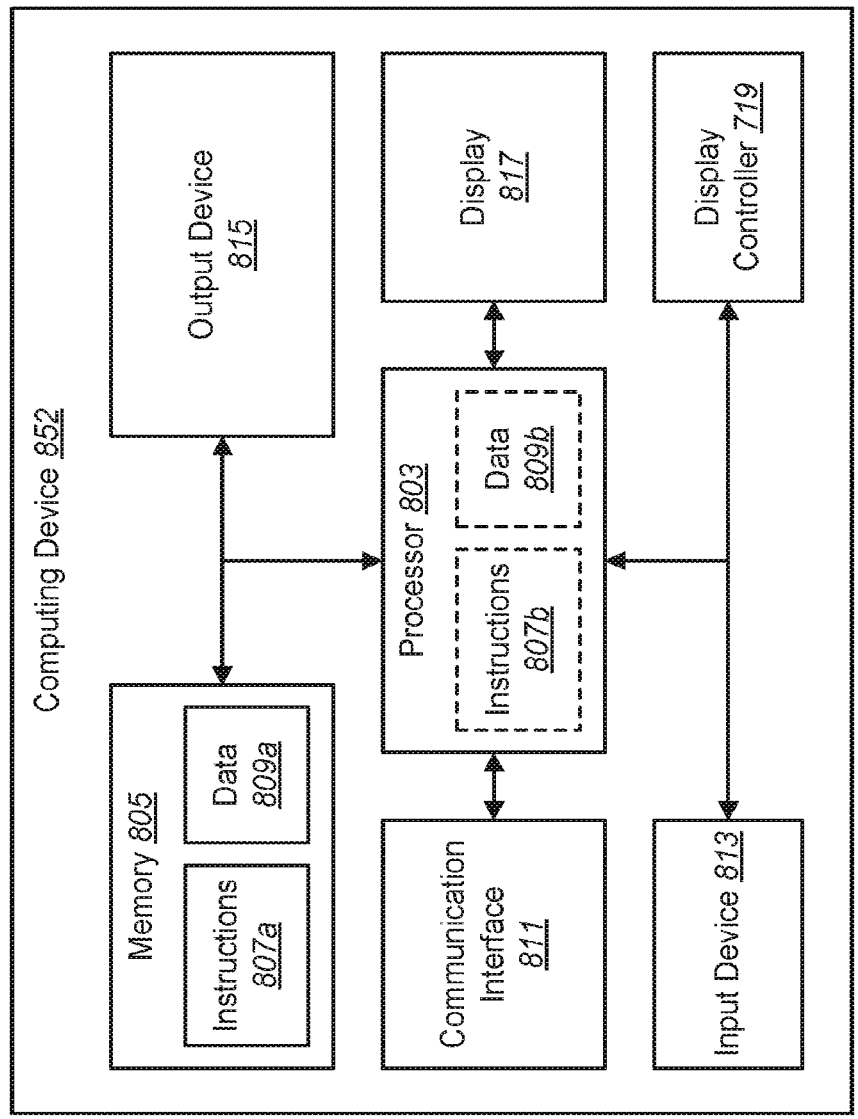
FIG. 8 illustrates various components that may be utilized in a computing device.

FIG. 8 illustrates various components that may be utilized in a computing device 852. The computing device 852 may be configured in accordance with one or more of the requesting management nodes 102*a*, 602*a*, the peer management node 102b and the management servers 104, 604, 704 and the responding management node 602b described herein.

The computing device 852 may include a processor 803 and memory 805. The memory 805 may include instructions 807a and data 809a. The processor 803 controls the operation of the computing device 852 and may be, for example, a microprocessor, a microcontroller, a digital signal processor (DSP) or other device known in the art. The processor 803 typically performs logical and arithmetic operations based on program instructions 807b and/or data 809b received from the memory 805.

The computing device 852 typically may include one or more communication interfaces 811 for communicating with other electronic devices. The communication interfaces 811 may be based on wired communication technology, wireless communication technology or both. Examples of different types of communication interfaces 811 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 852 typically may include one or more input devices 813 and one or more output devices 815. Examples of different kinds of input devices 813 include a keyboard, mouse, microphone, remote control device, button, joystick, trackball, touchpad, lightpen, etc. Examples of different kinds of output devices 815 include a speaker, printer, etc. One specific type of output device that may be included in a computer system is a display device 817. Display devices 817 used with configurations disclosed herein may utilize any suitable image projection technology, such as liquid crystal display (LCD), light-emitting diode (LED), gas plasma, electroluminescence, a cathode ray tube (CRT) or the like.

A display controller 819 may also be provided, for converting data stored in the memory 805 into text, graphics and/or moving images (as appropriate) shown on the display device 817. Of course, FIG. 8 illustrates only one possible configuration of a computing device 852. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A system configured for secure distribution, replication, and recovery of credentials, the system comprising:
a memory; and
one or more processors associated with a management node and operatively coupled to the memory, the one or more processors configured to:
determine that a credential is required to perform a task;
send a credential identification (ID) request to a management server;
receive, from the management server, the credential ID for the required credential from the management server;
determine that the credential is not stored in the memory;
responsive to a determination that the credential is not stored in the memory, send, to the management server, a request for the required credential that corresponds to the credential ID, wherein:
the request includes a public key of the management node,
the request is formatted to trigger the management server to send an encrypted instance of the credential to the management node that is encrypted using the public key of the management node, and receive the encrypted instance of the credential;
decrypt the encrypted instance of the credential using a private key of the management node to obtain the credential; and
perform the task using the credential after the encrypted instance of the credential is decrypted.

2. The system of claim 1, wherein:
the management node is a first management node in a network;
the network further includes a second management node; and
the encrypted instance of the credential is obtained by the management server from the second management node responsive to a request multicast by the management server prior to sending the encrypted instance of the credential to the first management node.

3. The system of claim 1, wherein the one or more processors are further configured to receive, from a user interface, information indicating that performance of the task requires the credential.

4. The system of claim 1, wherein:
the management node is a first management node;
the credential is a first credential;
the one or more processors are further configured to:
receive, from the management server, a multicast request including a public key of a second management node and requesting a second credential for the second management node;
in response to the memory including the second credential:
encrypt the second credential using the public key of the second management node to produce an encrypted instance of the second credential; and
send, via a unicast communication, the encrypted instance of the second credential to the management server; and
the first management node and the second management node are peer management nodes in a network having common tenancy.

5. The system of claim 1, wherein:
the management node is a first management node;
the credential is a first credential; and
the one or more processors are further configured to:
receive, from the management server, a multicast request including a public key of a second management node and requesting a second credential for the second management node;
when the memory includes a first encrypted instance of the second credential encrypted using the public key of the first management node:
decrypt the first encrypted instance of the second credential using the private key of the first management node to obtain the second credential;
encrypt the second credential using the public key of the second management node to produce a second encrypted instance of the second credential; and
send the second encrypted instance of the second credential to the management server.

6. A method of secure distribution, replication, and recovery of credentials, the method comprising:
determining that a credential is required to perform a task;
sending a credential identification (ID) request to a management server;
receiving, from the management server, the credential ID for the required credential from the management server;
determining that the credential is not stored in the memory;
responsive to a determination that the credential is not stored in the memory, sending, to the management server, a request for the required credential that corresponds to the credential ID, wherein:
the request includes a public key of the management node,
the request is formatted to trigger the management server to send an encrypted instance of the credential to the management node that is encrypted using the public key of the management node, and
receiving the encrypted instance of the credential;
decrypting the encrypted instance of the credential using a private key of the management node to obtain the credential; and
performing the task using the credential after the encrypted instance of the credential is decrypted.

7. The method of claim 6, wherein:
the management node is a first management node in a network;
the network further includes a second management node; and
the encrypted instance of the credential is obtained by the management server from the second management node responsive to a request multicast by the management server prior to sending the encrypted instance of the credential to the first management node.

8. The method of claim 6, further comprising receiving, from a user interface, information indicating that performance of a task requires the credential.

9. The method of claim 6, wherein:
the management node is a first management node;
the credential is a first credential;
the one or more processors are further configured to:
receive, from the management server, a multicast request including a public key of a second management node and requesting a second credential for the second management node;

in response to the memory including the second credential:
- encrypt the second credential using the public key of the second management node to produce an encrypted instance of the second credential; and
- send, via a unicast communication, the encrypted instance of the second credential to the management server; and the first management node and the second management node are peer management nodes in a network having common tenancy.

10. The method of claim 6, wherein:

the management node is a first management node;

the credential is a first credential; and the one or more processors are further configured to:

receive, from the management server, a multicast request including a public key of a second management node and requesting a second credential for the second management node;

when the memory includes a first encrypted instance of the second credential encrypted using the public key of the first management node:
- decrypt the first encrypted instance of the second credential using the private key of the first management node to obtain the second credential;
- encrypt the second credential using the public key of the second management node to produce a second encrypted instance of the second credential; and
- send the second encrypted instance of the second credential to the management server.

* * * * *